METHOD FOR MAKING SEMICONDUCTOR DEVICES

Original Filed Feb. 6, 1961

INVENTORS
Donald C. Dickson, Jr.
Robert M. Bird
BY Mueller & Aichele
ATT'YS

United States Patent Office 3,176,382

Patented Apr. 6, 1965

3,176,382

METHOD FOR MAKING SEMICONDUCTOR DEVICES

Donald C. Dickson, Jr., Scottsdale, and Robert M. Bird, Mesa, Ariz., assignors to Motorola, Inc., Chicago, Ill., a corporation of Illinois Original application Feb. 6, 1961, Ser. No. 87,136. Divided and this application Feb. 27, 1963, Ser. No. 261,535

9 Claims. (Cl. 29—155.5)

This invention relates to semiconductor devices and a method of manufacturing them such that the parts and subassemblies of the device can be assembled together with a minimum of manipulation and without the use of independent jigs or fixtures.

This is a divisional application from our copending application Serial No. 87,136, filed February 6, 1961.

The invention will be described herein as it is embodied in a semiconductor rectifier and a method of manufacturing it. However, the invention is not inherently limited to this particular device as will be apparent from the description which follows.

Semiconductor devices generally, as they are now provided, have at least some small parts which are difficult to handle manually at high speed. In order to produce such devices in large quantities on an economical basis, the parts should be constructed so that the device can be assembled quickly on a production line, and yet with the parts positioned accurately with respect to each other. It is particularly desirable if the parts and sub-assemblies are so constructed that they naturally assume their proper positions relative to one another as they are assembled together and stay in those positions during subsequent processing. Such a construction is referred to as "self-jigging," and this feature contributes significantly to the uniformity and reliability of the completed devices as well as providing cost savings in labor. However, a self-jigging construction has not been satisfactorily applied to the manufacture of rectifiers.

The semiconductor element, or die as it is sometimes called, is one of the smaller parts included in such devices, and the present invention is directly concerned with the positioning of this element and a lead which is connected to it during assembly of the device. In many semiconductor rectifier devices the semiconductor die is mounted on a base, and electrical connections are made to the die by one or more lead structures. If a metal base is used, the semiconductor die may be soldered to the base and to a lead simply by stacking the die and the lead together with solder preforms on the base and subsequently heating the assembly. In order for a worker to stack these elements properly on a production line where large numbers of units are manufactued at high speed, a certain amount of manual manipulation has been required, and it has sometimes been necessary to position the parts with jigs or fixtures.

It is an object of the present invention to provide a positioning structure for a semiconductor device which has a jigging function during assembly and manufacture of the device, and which is a part of the completed semiconductor device but independent of the electrical connector means for the semiconductor element.

Another object of the invention is to provide within the finished device a getter of moisture and impurities so as to reduce the effect of these substances on the semiconductor element, both during encapsulation of the device and thereafter, which getter has another function of assisting in the positioning of the semiconductor element.

Another object of the invention is to provide a semiconductor rectifier device with a mounting and enclosing structure which serves during the assembly of the device to originally position and then maintain an external lead and a semiconductor die in alignment with each other so that they can be easily assembled and connected together in a predetermined position without the use of independent jigs or fixtures.

One embodiment of the invention is illustrated in the accompanying drawings in which.

In practicing the invention in the illustrated semi-conductor device a metal mounting base or heat sink is provided with an internal recess for receiving and co-operating in the positioning of the semiconductor die or element, and with cover means therefor which supports a single wire lead externally of the device and positions the same for electrical connection to the internally mounted semiconductor element. Such element is secured to the mounting base within the recess, and the cover means closes the mounting base at the opening from the recess. The wire lead with its assocated connector means is electrically connected to the semiconductor element when the device is completed. Certain parts of the complete device contribute especially to a self-jigging assembly, and the method of the present invention provides a high speed, reliable manufacturing process from which uniform devices with a high degree of reliability are obtained.

Figure 3:
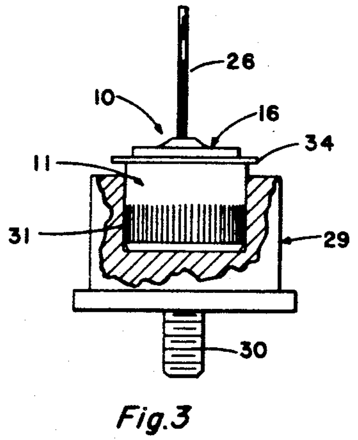
FIG. 3 is a view of the completed rectifier device which shows merely by way of illustration one way in which it can be connected to a metal mounting by means of an adaptor.
Figure 1:
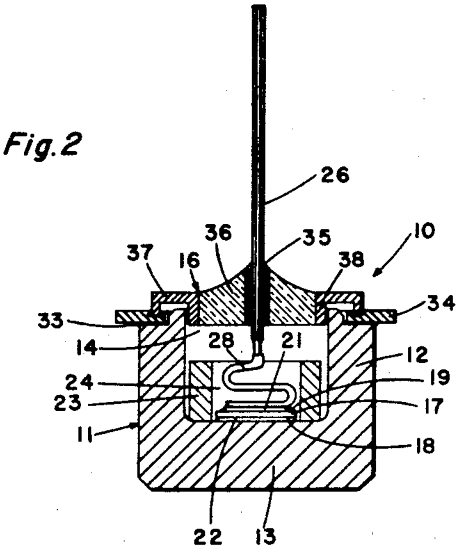
FIG. 1 is an enlarged cross-sectional view of a semiconductor rectifier device showing the parts in assembled position.

The device 10 illustrated in the drawings is a semiconductor rectifier of the type which has a silicon die, and includes a one piece heat sink member 11 having a cup-like configuration which receives or positions all the other parts of the device. The heat sink member 11 is preferably made of copper material and has a cylindrical wall 12 and an end wall 13, both of which are quite thick and therefore provide high heat conductivity and effective dissipation of heat generated within the device, as well as effective heat transfer to a mounting in the equipment to which it is ultimately applied. The originally open end of the recess 14 of the heat sink member 11 is closed in the final device as shown in FIGS. 1 and 3 by a header assembly 16. The header assembly 16 and the heat sink member 11 form a sealed enclosure for the parts provided within the device 10.

The semiconductor die or element 17 in the illustrated embodiment is of silicon, and is of the diffused junction type, with a PN junction within it. Suitable methods for fabricating such a die are well-known in the art and form no part of the present invention. Metallic coatings 18 and 19 are provided on opposite faces of the die as indicated by such reference characters in FIGS. 1 and 2. These coatings are applied by known plating methods and are more receptive to solder than the silicon material itself.

Figure 2:
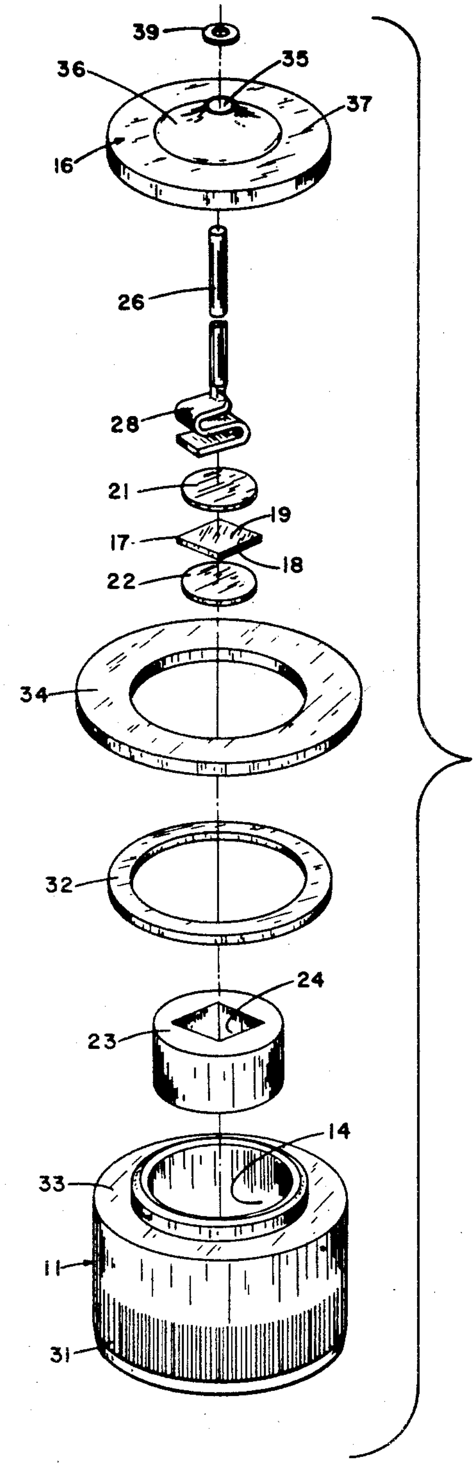
FIG. 2 is an exploded perspective view of the parts for the device of FIG. 1.

In the assembled device of FIG. 1, the die 17 is centered at the bottom of the recess 14 on the base portion 13 of the metal heat sink 11 and is mechanically secured thereto as well as electrically connected thereto by solder originally provided as a preform 22 (see FIG. 2). The centering or positioning of the die in the heat sink recess is aided by a member 23 which is dropped into the recess during assembly and before the die is placed therein as will be described. The member 23 is made of metalloaluminosilicate material in a crystalline dehydrated form known as molecular sieve material. There are many intracrystalline voids or cavities in this material which are mutually connected by pores, and these collectively admit and adsorb gaseous moisture and impurities which would otherwise adversely affect the silicon die 17. Such gaseous agents may remain inside the device 10 after it is fabricated despite all efforts to exclude them.

However, the member 23 has a function other than the adsorption function just described. As can be seen in FIG. 2, it has a central opening or bore 24 corresponding in shape to the rectangular die 17, and this opening should be only slightly larger than the die so that the latter is readily positioned therein during assembly but centered with only practical manufacturing tolerances relative to the wire lead and connector pieces shown in FIG. 1. In this respect the member serves a positioning function in the assembly of the device without the use of external jigs, as will be explained in more detail in describing the method of the present invention.

A lead 26 extends through the cover means for the semiconductor device and is assembled by another self-jigging step in the manufacturing process. It has a flexure portion 28 at its lower end as viewed in FIG. 1, which allows for expansion and contraction of the material of the lead 26 with temperature changes, and thus prevents breakage of the die or the solder connections due to such dimensional changes. The flexure portion 28 is in the form of an S-shaped ribbon which flexes readily when the straight portion of the lead 26 expands and contracts or when force is applied to the lead. The flexure portion may have some other configuration, such as a C-shape, if desired. The heat sink 11, the solder mass 22 and the metal coating on the face 18 of the die 17 establish a heat conductive ohmic connection to the die on one side of the junction within it. The lead member 26, the solder mass 21, and the metal coating on the face 19 of the die 17 establish a heat conductive ohmic connection to the die on the other side of the rectifying junction within it.

The heavy closed bottom construction of the cylindrical walled heat sink 11 makes it possible to insert this latter member into a metal receptacle or adaptor 29 in the manner illustrated in FIG. 3. The outer surface may be knurled as shown in FIGS. 2 and 3 at 31 so as to provide a tight and firm fit between the heat sink and the adaptor 29 which receives it, and the adaptor has a threaded stud 30 which may be used as a bolt to secure the device to a mounting, normally in the equipment in which the rectifier is to be used. The semiconductor device 10 may alternatively be pressed in the same manner directly into a cavity in the mounting itself.

More in particular as to the configuration of the ring or body 23, it is shown with an opening of a rectangular or square configuration in FIGS. 1 and 2. This particular shape is not critical, but it is significant that the opening is only slightly larger than the die 17. The opening 24 may be round, and if a square die is used, the diameter of the opening should be only slightly larger than the diagonal dimension of the die. A round die may be used with either a square or a round opening in the body 23. Because of the relation between the size of the opening 24 and the size of the die, the body 23 readily accepts and aids in locating the solder bodies 21 and 22, the die 17 and the flexure portion 28 of the lead 26 when these elements are assembled in the heat sink. Thus, the internal bore of the member 23 guides these elements as they are assembled and helps to maintain them in alignment with each other until they are permanently connected together by melting and then solidifying the solder. The member 23 is itself retained by the walls of the recess 14 of heat sink 11.

The device 10 is so constructed that it can be assembled in an economical, and logical manner with all pieces falling into place without independent jigging. The assembly method will be described primarily with reference to FIG. 2. First, a ring 32 of brazing material is seated on the shoulder 33 at the top of the heat sink, and a steel washer 34 is placed on the ring 32. The resulting assembly is passed through a furnace at a temperature of about 800° C. to form a brazed connection between the adjacent surfaces of the washer and the heat sink.

This sub-assembly is placed in the assembly line in an upright position with the open end of the recess 14 at the top. The hollow member 23 is placed on the bottom of the recess in the heat sink, and fitting fairly closely with the annular wall within such recess. There is a clearance of a few thousandths of an inch so that the opening or bore 24 is approximately centered axially of the heat sink. The member 23 need not be secured to the heat sink. The solder disc 22, the silicon die 17, and the other solder disc 21 are then stacked vertically in the order named at the bottom of the recess and against that face of the end wall 13 of the heat sink, and within the bore 24. The member 23 readily accepts the stacked parts just described, and helps to position the parts and maintain them in the proper stacked relation.

The lead 26 is inserted through the eyelet 35 in a glass or insulating portion 36 of the header, and a solder ring 39 is dropped over the lead onto the header 16. This assembly is then placed on the heat sink with the flexure portion 28 of the lead in contact with the solder disc 21. A steel ring 37 of the header has a flange portion 38 which fits inside the upper end of the heat sink member 11 as shown in FIG. 1. The header is retained in position by this placement and serves to hold the lead member 26 in alignment with the die and the solder discs. The fit between the flange portion 38 of the header and the inner wall of the heat sink is sufficiently close that the lead 26 is positioned and maintained right at the axis of the device. The weight of the lead member 26 helps to hold the die 17 and the solder bodies 21 and 22 against the bottom of the heat sink so that all of the surfaces to be soldered together are maintained in firm contact.

Furthermore, in this manner the wall around the recess of the heat sink 11 serves to position the member 23 and maintain it in position during assembly. The latter in turn does the same for the die and solder discs. As was just pointed out, the shoulder of the recess 14 positions the header 16 which in turn positions and maintains in position the lead 26 for connection to the die.

The complete assembly as just described is passed through a furnace and heated to a temperature sufficient to melt the solder parts 21, 22 and 39 so that the die 17 is soldered to the flexure portion 28 of the lead and also to the end wall 13 of the heat sink, and the straight portion of the lead is soldered to the eyelet 35. Any vapors and gases produced in the device during the soldering can rise to the top of the device, and some of these are adsorbed by the body 23.

The header assembly 16 is then welded to the washer 34. The welding is accomplished by pressing a welding head against the ring 37 and applying current to it, thereby effecting a current weld between the header and the washer 34. The shoulder at the top of the heat sink and the portion of the header which projects into the heat sink tend to block any impurities which are splashed or sprayed by the welding such that they cannot directly enter the enclosure. However, some gaseous moisture and other impurities may be introduced, and the concentration of these impurities is reduced by the member 23 which adsorbs them.

The self-jigging nature of the assembly is believed to be apparent from the foregoing description. The importance of this is partly due to the small size of the parts of the device, and such small parts are typical in semiconductor devices. In general the parts have dimensions ranging from about an inch down to a few thousandths of an inch, or even less in some devices.

The dimensions of a practical embodiment of the device of FIGS. 1 to 3 are presented in the following table.

*Over-all device 10*

| | Dimensions |
|---|---|
| Container height | .39″ |
| Length of exposed lead | .69″ |
| Maximum diameter | .62″ |

*Heat sink 11*

| | |
|---|---|
| Height | .315″ |
| Inside diameter | .312″ |
| Outside diameter | .495″ |
| Wall thickness **13** | .085″ |

*Hollow body 23*

| | |
|---|---|
| Outside diameter | .290″ |
| Inside dimensions | .15″ square |
| Height | .130″ |

*Die 17*

| | |
|---|---|
| Sides | .125″ x .125″ |
| Thickness | .0075″ |

It should be noted that the positioning function and the gettering function of the hollow body or member 23 are distinct from each other although they are advantageously incorporated in a single element in the illustrated embodiment. The positioning function can be accomplished equally as well by a hollow body which is not made of molecular sieve material. The material of such a body should be electrically insulating, or at least not highly conductive, in order to prevent shorting of the junction in the die 17 at its periphery. It is only necessary for the positioning structure for the die to be sufficiently insulating as to not adversely affect the desired electrical characteristics of the semiconductor die in operation of the device. This means that it should have a considerably higher resistivity than the semiconductor material of the die 17. The positioning of the lead which is provided by the header 16 and the heat sink 11 is significant because it means that all soldering can be accomplished in a single heating cycle, and it is not necessary to use jigs to hold the lead in alignment with the die.

We claim:

1. A method of assembling a semiconductor device including therein a mounting base and a hollow member maintained with said base in the assembled finished device which comprises, placing said hollow member on said mounting base for the semiconductor device, with said hollow member having an opening extending entirely therethrough and portions about said opening for guiding a semiconductor die upon placing the same in said opening retaining said hollow member relative to said mounting base so that a selected portion of said base is accessible through said opening, placing a semiconductor die with solder on opposite sides thereof in said opening, with said hollow member serving as a guide in the placement of said die in alignment with said selected portion of said mounting base for connection of one side of said die to said base, placing and retaining a connector in said opening with a portion thereof in alignment with said die for connection to the other side thereof, and subsequently subjecting the resulting assembly to a heating cycle such that said die is connected to said base and to said connector by said solder.

2. A method of assembling a semiconductor diode device which comprises, placing a hollow member of highly resistive material at the bottom of a cavity in a mounting structure with said hollow member having an opening extending entirely therethrough providing access to said cavity bottom and an internal wall defining said opening, placing a semiconductor die with solder on opposite sides thereof at the bottom of said mounting structure within the opening through said hollow member, placing a connector in said opening with a portion thereof in alignment with said die for connection thereto, retaining said connector in alignment with said die with a device closure structure through which said connector extends, subjecting the resulting assembly to a heating cycle such that said die is connected to said mounting structure and to said connector by solder, and securing said closure structure to said mounting structure to seal the juncture between them.

3. A method of assembling a semiconductor diode device which comprises, placing a semiconductor die and solder therewith in a metal mounting structure at a central position at the bottom of a recess opening in said mounting structure and within a hollow member at said bottom of said recess opening, inserting connecting means including an external lead through a central opening in an insulating portion of closure means for said device with a portion of the connecting means adapted for alignment with said die for connection thereto, placing the closure means together with said connecting means at the recess opening in said metal mounting structure such that a metallic portion of said closure means rests on said mounting structure at the top portion thereof and aligns said connecting means with said die, subjecting the resulting assembly to a heating cycle such that said die is connected to said connecting means and to said metal mounting structure by said solder, and joining said closure means to said metal mounting structure.

4. A method of assembling a semiconductor device, including the steps of placing a semiconductor element and solder therewith in a cup-like metallic base structure at the bottom of a recess opening inside said base structure and within a hollow member at said bottom of said recess opening, inserting an electrical lead through an opening in an insulating portion of a cover for said device so that one portion of said lead is on one side of said cover and another portion of said lead is on the other side of said cover, placing said cover and lead assembly on said cup-like base structure so that a metallic ring portion of said cover rests on a metallic portion of said base structure at the top of said recess opening and said cover aligns said lead with said semiconductor element, subjecting the resulting assembly to a heating and cooling cycle to melt and then solidify said solder such that said semiconductor element is electrically connected to said lead and to said metallic base structure, and sealing the enclosure formed by said metallic base structure and said cover.

5. A method of assembling a semiconductor device using the parts of said device to retain each other in the proper positions, said method including the steps of placing a highly resistive hollow member in a cup-like metallic base structure at the bottom of a recess opening inside said base structure, placing a semiconductor element and solder at the bottom of said recess opening inside said hollow member, with said hollow member serving to guide said semiconductor element and solder to a centered position on said base structure and serving to confine the same there, placing an assembly of a cover and a lead at the top of said cup-like base structure with said lead extending upward through a central bore in said cover so that said cover closes said recess opening and retains said lead in alignment with said semiconductor element, subjecting the resulting assembly to a heating and cooling cycle to melt and then resolidify said solder such that said semiconductor element is electrically connected to said lead and to said metallic base structure, and sealing the enclosure formed by said metallic base structure and said cover.

6. A method of assembling a semiconductor device, including the steps of placing a cup-like metallic base structure having an open end and a closed end in an assembly position with said open end at the top of said structure, placing a hollow member of highly resistive material at the bottom of a recess opening inside said base structure, placing a semiconductor element and solder at the bottom of said opening inside said hollow member, with said hollow member acting as a guide for the placement of said semiconductor element and solder and then acting to confine the same at a centered position on said base structure during further assembly of the device, placing an assembly of a cover and a lead at the top of said opening with said lead then extending upward through a central bore in said cover so that said cover closes said opening and aligns said lead with said semiconductor element, subjecting the resulting assembly to a heating and cooling cycle to melt and then resolidify said solder so that said semiconductor element is electrically connected to said lead and to said base structure, and welding said cover to said base structure to provide a sealed joint about said open end of said structure.

7. A method of assembling a semiconductor device using the parts of the device to retain each other in proper positions during the assembly, said method including the steps of placing a cup-like metallic base structure having an open end and a closed end in an assembly position with said open end at the top of said structure, placing a semiconductor element and solder in a central position at the bottom of a recess opening inside said base structure and within a hollow member at said bottom of said recess opening, placing an assembly of a cover and a lead at the top of said recess opening with said lead then extending upward through a central opening in an insulating portion of said cover and with a metallic portion of said cover then resting on said open end of said base structure such that said cover closes said recess opening and aligns said lead with said semiconductor element, subjecting the resulting assembly to a heating and cooling cycle to melt and then solidify said solder so that said semiconductor element is connected electrically to said base structure and to said lead, and welding the metallic portion of said cover to the open end of said metallic base structure to provide a sealed joint at said open end.

8. The method of claim 7 including the further step of placing solder at the juncture between said lead and said cover, which solder is melted and solidified during said heating and cooling cycle to provide a sealed joint between said cover and said lead.

9. A method of assembling a semiconductor device, including the steps of placing a semiconductor element and solder in a cup-like metallic base structure at a central position at the bottom of a recess opening inside said base structure and within a hollow member at said bottom of said recess opening, placing an assembly of a cover and a lead at the top of said base structure so that a metallic ring portion of said cover rests on a metallic portion of said base structure at the top thereof and said lead extends upward from said semiconductor element and solder through a central opening in an insulating portion of said cover, whereby said cover retains said lead in alignment with said semiconductor element for connection thereto, subjecting the resulting assembly to a heating and cooling cycle to melt and then resolidify said solder such that said semiconductor element is electrically connected to said lead and to said metallic base structure, and joining said metallic ring portion of said cover to said metallic top portion of said base structure.

References Cited in the file of this patent

UNITED STATES PATENTS

| | | |
|---|---|---|
| 2,693,022 | Gurewitsch | Nov. 2, 1954 |
| 2,830,238 | Gudmendsen | Apr. 8, 1958 |
| 2,960,639 | Tipple | Nov. 15, 1960 |
| 3,060,553 | Kelley | Oct. 30, 1962 |

FOREIGN PATENTS

| | | |
|---|---|---|
| 1,105,526 | Germany | Apr. 27, 1961 |